United States Patent [19]

Jarmon et al.

[11] Patent Number: 4,949,921

[45] Date of Patent: Aug. 21, 1990

[54] METHOD OF MOLDING FIBER REINFORCED GLASS MATRIX COMPOSITE ARTICLES

[75] Inventors: David C. Jarmon, Kensington; Eric Minford, Windsor, both of Conn.

[73] Assignee: United Technologies Corporation, Hartford, Conn.

[21] Appl. No.: 395,169

[22] Filed: Aug. 17, 1989

Related U.S. Application Data

[63] Continuation of Ser. No. 90,713, Aug. 28, 1987, abandoned.

[51] Int. Cl.$^5$ .............................................. B64C 3/24
[52] U.S. Cl. .................................... 244/123; 264/45.3
[58] Field of Search ............... 244/123, 131, 132, 133; 416/223 A, 241 A, 241 B, 229 A, 230, 224; 428/698, 113, 114; 264/45.3, 46.6, 46.8

[56] References Cited

U.S. PATENT DOCUMENTS

| | | | |
|---|---|---|---|
| 2,783,966 | 3/1957 | Sorensen | 416/241 B |
| 3,176,775 | 4/1965 | Clemens | 244/123 |
| 3,279,487 | 12/1973 | Aston et al. | 244/123 |
| 3,305,196 | 2/1967 | Hanlon | 416/241 A |
| 3,637,325 | 1/1972 | Morley | 416/241 A |
| 4,324,843 | 4/1982 | Brennan et al. | 428/697 |
| 4,464,192 | 8/1984 | Layden et al. | 65/18.1 |
| 4,626,461 | 12/1986 | Prewo et al. | 428/698 |
| 4,692,099 | 9/1987 | Homme et al. | 416/241 B |

FOREIGN PATENT DOCUMENTS 1328167  8/1973  United Kingdom ............ 416/241 B

Primary Examiner—Galen Barefoot
Attorney, Agent, or Firm—Harry J. Gwinnell; Kevin E. McVeigh; James M. Rashid

[57] ABSTRACT

A fiber reinforced glass matrix composite article and a process for fabricating a fiber reinforced glass matrix composite article are disclosed. The article has an outer layer with selectively oriented continuous fiber reinforcement and an inner core having randomly oriented discontinuous fiber reinforcement. The process utilizes the hydrostatic pressure provided by injection molding of the discontinuous fiber reinforced core to fully consolidate the continuous fiber reinforced outer layer.

3 Claims, 3 Drawing Sheets

METHOD OF MOLDING FIBER REINFORCED GLASS MATRIX COMPOSITE ARTICLES

This invention was made with Government support under a contract awarded by the Department of the Air Force. The Government has certain rights in this invention.

This is a continuation of U.S. Ser. No. 090,713, filed Aug. 28, 1987, now abandoned.

1. Technical Field

The field of art to which this invention pertains is fiber reinforced composite articles.

2. Background Art

It has been widely recognized that the selective use of fiber reinforced composite materials to replace metals can result in significant performance benefits. These benefits arise from the exceptional combination of high stiffness, high strength and low density that characterize fiber reinforced composite materials and from the ability to tailor the properties of a particular composite article to fit the demands for the particular application.

The use of composites has expanded rapidly, particularly within the aerospace and automotive industries. Fiber reinforced glass matrix and fiber reinforced glass-ceramic matrix composites have been developed for high temperature applications. Methods have been developed that allow the fabrication of high strength fiber reinforced glass matrix composite articles of relatively simple geometry (e.g. a flat rectangular plate), or of lower strength fiber reinforced glass matrix composite articles of relatively complex or irregular geometry (e.g. rotationally symmetrical articles).

What is needed in the art is a high strength fiber reinforced glass matrix composite article of complex geometry and a method for producing such an article.

DISCLOSURE OF THE INVENTION

A fiber reinforced glass matrix composite article is disclosed. The article comprises an outer layer having selectively oriented continuous fiber reinforcement, and an inner core having substantially randomly oriented discontinuous fiber reinforcement.

A further aspect of the disclosure is a fiber reinforced glass matrix arifoil comprising an outer layer having a selectively oriented continuous fiber reinforcement and an inner core having substantially randomly oriented discontinuous fiber reinforcement.

A further aspect of the disclosure is a process for fabricating a fiber reinforced glass matrix composite article comprising laying up at least one ply of glass impregnated continuous fiber tape in a selected orientation against an inner surface of a die, the inner surface of said die defining a mold cavity, and subsequently introducing a fluid mixture of discontinuous fibers and molten glass to the mold cavity to substantially fill the mold cavity, and applying pressure to the fluid mixture to compress the fluid mixture and to compress and consolidate the plies of continuous fiber tape to form a fiber reinforced glass matrix composite article having a discontinuous fiber reinforced glass matrix composite inner core and continuous fiber reinforced glass matrix composite outer layer.

The foregoing and other features and advantages of the present invention will become more apparent from the following description and accompanying drawings.

BEST MODE FOR CARRYING OUT THE INVENTION

Figure 1:
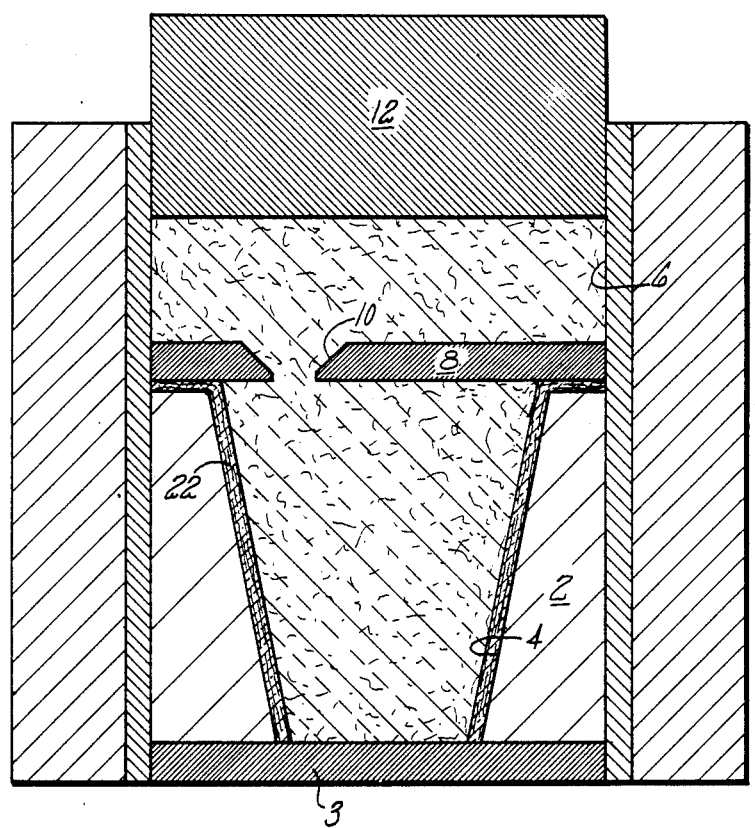
FIG. 1 shows a cross-section of an apparatus for fabricating an article of the present invention.

In a given composite article of the present invention, the same glass matrix material is used in both the continuous fiber reinforced region and the discontinuous fiber reinforced region. The glass matrix material is chosen to impart high strength at elevated temperatures. Borosilicate (e.g. Corning 7740), high silica (e.g. Corning 7930) or aluminosilicate (e.g. Corning 1723) as well as mixtures of glasses are suitable matrix materials. Glass-ceramic materials (e.g. lithium aluminosilicate) may also be used as the glass matrix material. The choice of glass matrix material is dependent upon the particular demands of a particular application. For example, borosilicate glass is the preferred glass matrix material for applications which require resistance to temperatures of up to about 550° C., because while its temperature resistance is low in relation to other glass materials, borosilicate glass is more easily processed. For applications which require resistance to temperature of up to about 1200° C., lithium aluminosilicate glass is the preferred matrix material due to its superior temperature resistance.

The fiber reinforcement of the present invention may comprise any fiber that exhibits high tensile strength and high tensile modulus at elevated temperatures and is stable at elevated temperatures. Suitable fibers include graphite fibers, silicon carbide fibers, silicon nitride fibers, and refractory metal oxide fibers. Silicon carbide fibers are preferred. A multi-filament silicon carbide yarn with an average filament diameter of up to about 10 microns is especially preferred. NICALON ® yarn (Nippon Carbon Company) is a silicon carbide yarn that has been found to be particularly suitable for the practice of the present invention.

While different fiber materials and/or different matrix materials may be used in the contiuous fiber reinforced region and in the discontinuous fiber reinforced region of the article of the present invention, it is preferred that the same fiber material, and matrix material be chosen for both regions in order to harmonize the coefficient of thermal expansion of the respective regions.

A process for making continuous fiber reinforced glass-ceramic matrix composites is disclosed in commonly assigned U.S. Pat. No. 4,324,843, the disclosure of which is incorporated by reference.

It is preferred that the fiber reinforcement comprises a volume fraction of between about 20% and about 60% of the continuous fiber reinforced glass matrix region. It is difficult to obtain a proper distribution of continuous fibers if the volume fraction of fiber is below about 20%, and the shear properties of the glass matrix composite material are reduced if the volume fraction of fiber exceeds about 60%.

The discontinuous fiber reinforced region of the composite article of the present invention is fabricated using a mixture of discontinuous fibers and glass powder (chopped molding compound). The process for making the chopped molding compound is disclosed in commonly assigned U.S. Pat. No. 4,464,192, the disclosure of which is hereby incorporated by reference.

It is preferred that the discontinuous fiber and glass matrix molding compound be comprised of about 50 volume percent to 85 volume percent glass matrix material.

The process of the present invention may be illustrated by reference to FIGS. 1 and 2.

Figure 2:
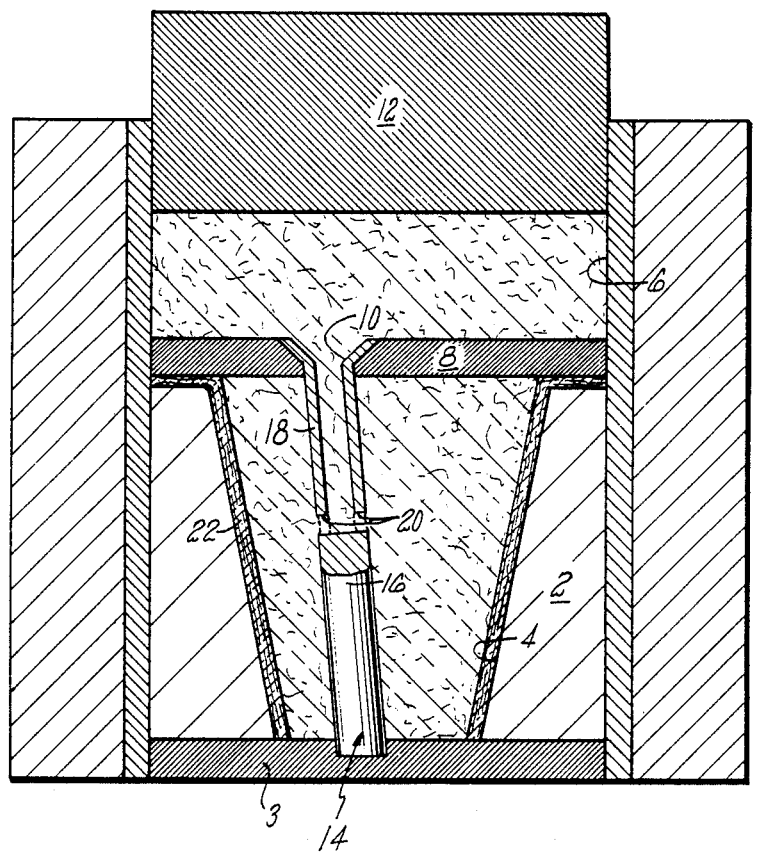
FIG. 2 shows a cross-section of an apparatus for fabricating an article of the present invention.

FIGS. 1 and 2 show cross-sectional views of suitable molding apparatii, including a die (2) and a lower plate (3) which define a mold cavity (4), a reservoir (6) substantially separated from the mold cavity (4) by an upper plate (8) having an orifice (10), and a ram (12) slidably received within the reservoir (6).

The apparatus in FIG. 2 is similar to that shown in FIG. 1, with the addition of an injection tube (14) extending from the orifice (10) to the lower plate (3). The injection tube (14) has a solid lower portion (16) and a hollow upper portion (18). The wall of the hollow upper portion (18) is perforated by at least one opening (20). Use of the injection tube allows improved control of the flow pattern of the chopped molding compound to, for example, reduce the shear forces on the outer plies. The injection tube comprises a material such as graphite, stainless steel or molybdenum that may be removed from the finished article by, for example, machining, etching or oxidizing.

Briefly, the process of the present invention involves lining the mold cavity with plies of continuous fiber reinforced glass matrix tape and injection molding a quantity of chopped molding compound to substantially fill the mold cavity and to consolidate the outer continuous fiber reinforced plies by the internal application of hydrostatic pressure to compress the outer plies against inner surface of the die.

Glass impregnated continuous fiber plies (22) are laid up against the die (2) to line the mold cavity (4). The continuous fiber reinforced plies are selectively arranged to provide the desired properties in the finished article. It is important to note that care must be exercised in designing the layup pattern in order to minimize movement and disorientation of the continuous fibers during the injection molding process. It is preferred that the fiber reinforcement of the innermost ply be oriented in alignment with the direction of the bulk flow of chopped molding compound to reduce shear forces on the continuous fiber plies during injection of its chopped molding compound. It is also preferred that the innermost continuous fiber reinforced ply be of sufficient length to allow the ply to be secured between the upper plate (8) and the top portion of the die (2). Securing the innermost ply to the top of the die and orienting the fiber reinforcement of the innermost ply along the bulk flow path of chopped molding compound helps to prevent buckling and/or disorientation of the continuous fiber plies during transfer of the chopped molding compound from the reservoir to the mold cavity.

It is preferred that each continuous fiber reinforced ply be warm molded by heating the ply to a temperature sufficient to render the ply compliant and compressing the heated ply to reduce the volume of the ply. Volume reduction of the plies is referred to as "debulking". It is most preferred that the continuous fiber reinforced plies be heated to a temperature between about 140° C. and about 160° C. and compressed at a temperature between about 60 psi and about 100 psi for a time period between about 15 minutes and about 45 minutes by, for example, compressing the ply between the heated platens of a press. The warm, partially debulked ply is then laid up in the die. The warm molding technique facilitates contouring the plies to the internal surface of the die.

The reservoir is filled with the chopped molding compound and the chopped molding compound is heated to a temperature sufficient to soften the glass and allow the chopped molding compound to flow. Typically, this requires heating to a temperature between 1000° C. and about 1400° C. to produce a nominal matrix viscosity of about $10^2$ poise and $10^4$ poise. Increasing the temperature above about 1400° C. substantially increases the probability of undesired chemical interaction between the fiber and matrix materials, and should be avoided.

Pressure is applied to the chopped molding compound in the reservoir by means of the ram (12). Sufficient pressure is applied to force the chopped molding compound from the reservoir through the orifice, or through the orifice and injection tube, and into the mold cavity. Once the mold cavity is filled sufficient pressure must be exerted upon the molding compound to consolidate the continuous fiber reinforced plies that line the mold cavity. Typically, a pressure between about 250 psi and about 500 psi must be exerted on the outer plies in order to consolidate the outer plies. Due to the pressure drop across the system, a higher pressure must be exerted on the chopped molding compound in the reservoir. Typically, a pressure of between about 500 psi and about 2000 psi is required. It is preferred that a pressure between about 1000 psi and about 1500 psi be exerted on the chopped molding compound in the reservoir. The internal pressurization provided by compression of the chopped molding compound compresses the continuous fiber reinforced plies against the interior surface of the die.

The pressure and elevated temperature are maintained for a time sufficient to fully consolidate the continuous fiber reinforced plies. This may typically be accomplished in a time period between about 5 minutes and about 1 hour. Once the mold is filled and the continuous fiber plies are fully consolidated, heating is discontinued and the pressure is maintained for a time period of sufficient duration to allow the mold and article to cool to a temperature below the annealing temperature of the matrix.

EXAMPLE I

Silicon carbide yarn (NICALON ®) yarn was coated with a slurry of lithium aluminosilicate glass powder, water and binder and wound onto a mandrel to form a tape. The tape was dried and cut into 0.2 inch lengths. The chopped material was then heat treated in air to burn off the organic binder. A small amount of additional lithium aluminosilicate glass powder was then added to obtain a matrix concentration of about 25 volume percent.

A continuous fiber reinforced composite preform was prepared. The preform was prepared by fabricating a silicon carbide fiber lithium aluminosilicate tape by the process outlined above, cutting rectangular sheets from the tape, and stacking the tapes in a 0 /+45/−45/90° lay-up to line the mold cavity. The innermost (90°) layer was made longer than the mold cavity and the extra length wedged between the upper portion of the die and the upper plate. The stack of plies was molded at 150° C. and 80 psi to produce a sheet 0.075 inches thick that conformed to the inside of the molding cavity. The mold and continuous fiber reinforced preform were heated in air to decompose the organic binder material.

Approximately 600 grams of chopped molding compound were loaded into the reservoir and heated to about 1200° C. The reservoir was pressurized to 1200 psi to force the chopped molding compound through a 0.5 inch diameter orifice into the continuous fiber reinforced ply lined molding chamber. The elevated temperature and pressure were maintained for approximately 30 minutes while filling the mold and consolidating the continuous fiber reinforced outer plies. Upon consolidation of the outer plies the heating was discontinued and the mold and contents were allowed to cool to a temperature of 500° C. under pressure.

Figure 3:
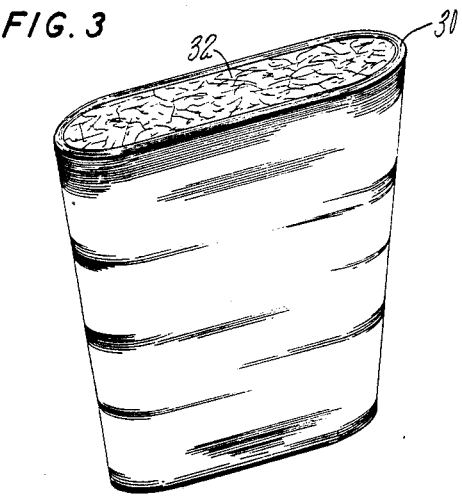
FIG. 3 shows a fiber reinforced glass matrix article of the present invention.

The fiber reinforced glass matrix composite article so formed is shown in FIG. 3. The article comprised a selectively oriented continuous fiber reinforced outer layer (30) and a substantially randomly oriented discontinuous fiber reinforced core (32). The article was approximately 4 inches long, 3.9 inches wide and 1 inch thick with rounded leading and trailing edges.

EXAMPLE II

Figure 4:
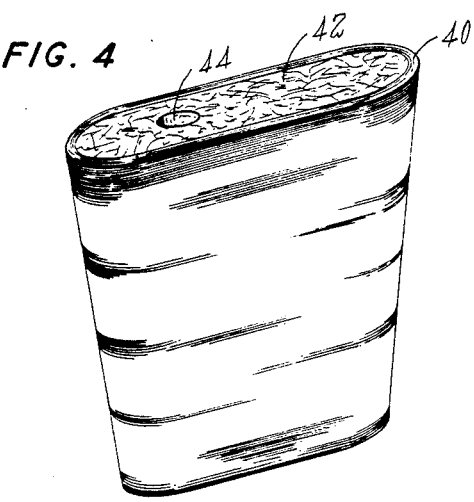
FIG. 4 shows a fiber reinforced glass matrix article of the present invention.

A fiber reinforced glass matrix composite article is fabricated following the procedure of Example I, except that the chopped molding compound is introduced to the mold cavity through a stainless steel injection tube as shown in FIG. 2. After consolidation, the injection tube is removed from the fiber reinforced glass matrix composite article by exposure to 25 volume percent hydrochloric acid and 75 volume percent nitric acid to produce the article shown in FIG. 4. The article comprises a selectively oriented continuous film reinforced outer layer (40), a substantially randomly oriented discontinuous fiber reinforced core (42) having a channel (44) left by removal of the injection tube.

EXAMPLE III

Figure 5:
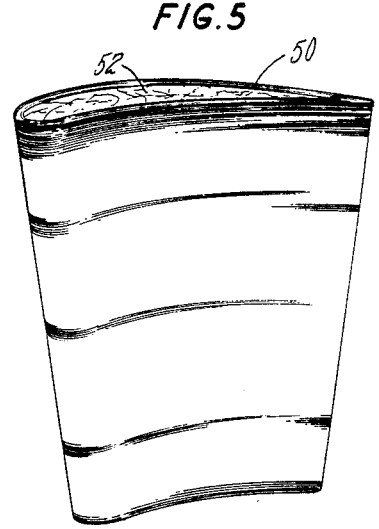
FIG. 5 shows a fiber reinforced glass matrix composite airfoil.

A fiber reinforced glass matrix composite airfoil is fabricated according to the procedure of Example I, using a suitably shaped die. The airfoil so produced is shown in FIG. 5. The airfoil comprises a selectively oriented continuous fiber reinforced outer layer (50) and a substantially randomly oriented discontinuous fiber reinforced core (52).

The process of the present invention provides the toughness and strength of an outer skin comprising a glass matrix reinforced by selectively oriented continuous fibers in a fiber reinforced glass matrix composite article of complex shape, a combination unobtainable by methods of the prior art. Examples of articles having complex shapes include rotational solids, such as cylindrical articles and airfoil shaped articles with surfaces characterized by compound curvature. Prior art techniques such as hot pressing do not allow the control of the orientation of the continuous fiber reinforcement of the outer layer that the present method provides due to fiber buckling associated with the application of consolidating pressure to the outer surface of the article. The process of the present invention provides internal pressurization to eliminate fiber buckling problems while simultaneously forming a discontinuous fiber reinforced glass matrix composite inner core for the article of the present invention.

The discontinuous fiber reinforced inner core provides the article with increased compressive strength and increased resistance of the article to structural buckling under load.

The use of the injection tube provides a means for forming channels within the discontinuous fiber reinforced core while providing improved fiber distribution on the surface of the channel. Such channels are useful as, for example, to provide a flow path for cooling medium or to reduce the weight of the article.

Although this invention has been shown and described with respect to detailed embodiments thereof, it will be understood by those skilled in the art that various changes in form and detail thereof may be made without departing from the spirit and scope of the claimed invention.

We claim:

1. A process for fabricating a fiber reinforced glass matrix composite article, comprising:
    laying up at least one ply of glass impregnated continuous fiber tape against an inner surface of a die, wherein said continuous fibers are oriented against the die surface in a first direction and define a mold cavity, and subsequently
    introducing a fluid mixture of discontinuous fibers and molten glass into the mold cavity to substantially fill the mold cavity wherein said mixture is introduced into the cavity in a direction aligned with said first direction, and
    applying pressure to the fluid mixture to compress the fluid mixture and to compress and consolidate the continuous fiber tape to form a fiber reinforced glass matrix composite article having a discontinuous fiber reinforced glass matrix composite inner core and continuous fiber reinforced glass matrix composite outer layer.

2. The process of claim 1, wherein said continuous fibers are oriented in alignment with the direction of bulk flow of the fluid mixture of fibers and molten glass into the die, whereby shear forces on said continuous fibers are reduced during said introducing step.

3. The process of claim 2, comprising the step of laying up a plurality of plies in the die such that a ply of said plurality of plies is against the inner surface of the die, and said continuous fibers in the innermost ply are in alignment with the direction of bulk flow of the fluid mixture.

* * * * *